United States Patent [19]
Hubbard, Jr.

[11] Patent Number: 5,402,111
[45] Date of Patent: Mar. 28, 1995

[54] SIMPLIFIED FLUID FLOW DETECTOR

[76] Inventor: Charlie J. Hubbard, Jr., Hubbard Engineering, P.O. Box 3185, Lubbock, Tex. 79452

[21] Appl. No.: 149,757

[22] Filed: Nov. 10, 1993

[51] Int. Cl.⁶ ............................................. G08B 21/00
[52] U.S. Cl. .................................. 340/608; 340/606; 73/204.13
[58] Field of Search ....................... 340/608, 599, 606; 73/151, 204.13, 204.14, 204.17, 204.19; 417/14, 13, 32; 307/117, 118

[56] References Cited

U.S. PATENT DOCUMENTS

| | | | |
|---|---|---|---|
| 2,707,440 | 5/1955 | Long et al. | 103/25 |
| 3,199,348 | 8/1965 | Salera | 73/204.19 |
| 3,438,254 | 4/1969 | Seeley | 73/204 |
| 3,570,310 | 3/1971 | Densmore | 73/204 |
| 3,898,638 | 8/1975 | Deane et al. | 340/599 X |
| 4,311,047 | 1/1982 | Hubbard, Jr. et al. | 73/204 |

Primary Examiner—Jeffery A. Hofsass
Attorney, Agent, or Firm—David L. Mossman

[57] ABSTRACT

The invention detects the presence of a liquid or liquid flow, and it is used to control pumping of a well when the quantity of liquid being discharged by the pump per stroke is much less than the volumetric displacement of the pump. A fluid flow detector 96 includes a single thermally conducting body 98, a first heater 100 for heating the first end or portion 97 of the thermally conducting body 98, a first temperature detector 108 for detecting the temperature of the first portion 97 of the thermally conducting body 98, first insulation material 122 for thermally insulating the first portion 97 of the thermally conducting body 98, second insulation material 136 for thermally insulating the second end or portion 99 of the thermally conducting body 98, a second heater 106 for heating the second portion 99 of the thermally conducting body 98 and a second temperature detector 110 for detecting the temperature of the second portion 99 of the thermally conducting body 98, all being inside a closed-ended stainless steel tube 102 protruding inside of conduct 104. The thermal conductivity of the second insulation material 136 is greater than that of first insulation material 122. One embodiment also includes an electrical bridge 112 for comparing the relative rates of heat loss between the first portion 97 and second portion 99 of the thermally conducting body 98.

23 Claims, 5 Drawing Sheets

SIMPLIFIED FLUID FLOW DETECTOR

FIELD OF THE INVENTION

The invention relates generally to fluid detectors and, in one of its aspects, to a method and apparatus for detecting fluid flow, and in one embodiment, to a method for detecting oil well pumpoff and to an oil well pumping control unit.

BACKGROUND OF THE INVENTION

A condition known as "pumpoff" occurs in a well when the quantity of liquid being discharged by the pump per stroke is much less than the volumetric displacement of the pump. If the pump continues to operate without sufficient supply of liquid, the polished rod which transmits motion to the pump and its seals may overheat and be damaged or destroyed. Once pumpoff occurs, it is usually desirable to stop the pump to eliminate needless energy use and equipment wear. The pump may be restarted again after a sufficient time has passed to allow replenishment of the liquid column in the well annulus.

Several devices which control a pump power source in response to some property of the pumping system are commercially available. Each of the different control devices monitors either directly or indirectly the quantity of liquid being pumped and disconnects the pump power source whenever the liquid being pumped falls below a predetermined value.

One group of control devices uses flow sensors which incorporate impellers, paddles, or differential pressure devices to measure the liquid flow rate from the pump at the wellhead. Mechanical devices like these tend to fail in service because of corrosion, scale build up and blockage by debris.

Beam monitor and rod tension devices are also used. Strain gauges are attached to the pump jack beam and mechanical or electronic tension gauges known as "dynomometers" are attached to the pumping rod or its support members to determine the stress on the rodstring as a function of time. The shape of the stress versus time graph is related to the quantity of liquid lifted by the down hole pump.

Some of the control systems use sonic sounding devices. An acoustical impulse is propagated down the annular region between the tubing and well casing. The return echo is analyzed to determine the height of the liquid in the annulus. The height and rate of change of height of the liquid column is used to determine a suitable pumping cycle.

Other control units use temperature sensors to determine the temperature of the polished rod. When the flow of liquid from the wellhead begins to decrease, the polished rod is no longer adequately cooled and its temperature increases because of frictional heating. The rising temperature of the polished rod is detected and used as a control parameter.

Temperature-based oil well fluid flow detectors are known, such as in the form of a flow tube having an upstream and a downstream distributed temperature sensitive element placed around the tube, and further having a distributed heating element placed around the tube downstream of the downstream temperature sensitive element as described in U.S. Pat. No. 3,438,254.

U.S. Pat. No. 2,707,440 describes an oil well pump control system for use in producing a well fluid at a temperature above atmospheric temperature which shuts off the pump once the temperature of the fluid falls below a certain threshold.

There is also an apparatus for sensing fluid flow or the lack of the same in a conduit, such as crude oil in a pipe, described in U.S. Pat. No. 3,570,310. The apparatus comprises a fluid flow conduit made of a heat conducting material such as brass, an electrical heater mounted in thermal contact on the outside of the conduit, and an electrical switch responsive to changes in temperature mounted on the conduit, whereby an increase in the temperature of the conduit causes the electrical switch to trip. The switch is connected to an indicating and recording device such as a chart which shows the amount of time that it is switched to the higher temperature level and vice versa. In operation, the electrical heater heats the metal conduit and the fluid flowing through the conduit. If no flow occurs in the conduit, the conduit rapidly heats up to a higher temperature level and causes the temperature sensing switch to trip, remotely indicating to the recording device that the switch is in the no-flow position.

Some oil well control units determine the rate at which electrical energy is consumed by the pump power source since the amount of power used depends on the quantity of liquid being pumped.

Of interest is a device described in U.S. Pat. No. 4,311,047 to Charlie J. Hubbard, Jr., et al. That patent describes a fluid presence detector which detects the presence of liquid which is used to control pumping of a well when the quantity of liquid being discharged by the pump per stroke is much less than the volumetric displacement of the pump. The fluid detector includes a first thermally conducting body, a first heater, a first temperature detector, insulation material for thermally insulating the first thermally conducting body, a separate, second thermally conducting body physically exposed to the inside of a conduit, a second heater for heating the second thermally conducting body and a second temperature detector for detecting the temperature of the second thermally conducting body or the second heater. The two thermally conducting bodies are thermally insulated from one another, and the same insulation surrounds both. One arrangement also includes an electrical bridge network for comparing the relative rates of heat loss from the two thermally conducting bodies.

One disadvantage with the configuration of the '047 patent device is that the detector would be subject to corrosive attack. Thus, it would be an advance in the art if the detector could be made more resistant to corrosion. Further, the '047 device had trouble with temperature drift over the course of its use.

SUMMARY OF THE INVENTION

Accordingly, it is an object of the present invention to provide a method and apparatus for determining the presence or absence of liquid flow at a location in the production tree where liquid is replaced by gas in the event of pumpoff. If liquid or liquid flow is not present for a predetermined length of time, then the pump is turned off.

It is another object of the present invention to provide a method and apparatus for detecting well pumpoff, which include heating an insulated, but singular thermally conductive body in a closed-end tube at a location in the production tree where liquid is replaced by gas in the event of pumpoff. The body is more insulated at one end than at the other end of body, the less insulated end being in more close contact to the fluid flow, if fluid is flowing. The method further includes a mechanism for determining if the relative rate of heat loss from the two ends is different from the relative rate of heat loss when liquid or liquid flow is present at the location.

It is yet another object of the invention to provide an apparatus for accomplishing the above objects which is resistant to corrosion.

Another object of the present invention is to provide a simpler apparatus for accomplishing the foregoing objectives than was achievable in the past.

In carrying out these and other objects of the invention, there is provided, in one form, an apparatus for detecting the presence of a fluid flowing in a conduit, which includes a thermally conducting body having a first end and a second end, at least the second end is placed inside the conduit for determining fluid presence or flow. A first heater for heating the first end of the thermally conducting body, which heater is present thereon, and a second heater for heating the second end of the thermally conducting body, which heater is present thereon. First insulation of a first low thermal conductivity surrounds the first end of the thermally conducting body and the first heater, while second insulation of a second low thermal conductivity surrounds the second end of the thermally conducting body and the second heater. The second low thermal conductivity has higher thermal conductivity than the first low thermal conductivity. There is also present a mechanism for comparing the relative rates of heat loss from the first end of the thermally conducting body and the second end of the thermally conducting body.

A preferred embodiment of an apparatus according to the present invention includes a thermally and electrically conducting body having a first end and a second end enclosed in a close-ended stainless steel tube for placement inside the conduit; a first positive temperature coefficient thermistor having a first terminal and a second terminal; first insulation on the first end, the first thermistor and two-thirds of the body; a second positive temperature coefficient thermistor having a first terminal and a second terminal and second insulation on the second end, second thermistor and remainder or one-third of the body for exposing to the inside of the conduit. There is also present a mechanism for comparing the relative electrical resistance of the first thermistor and the second thermistor. The relative resistance of the two thermistors when fluid is flowing across the second end of the thermally and electrically conducting body is measurably different from when the fluid is not flowing across the second end of the thermally and electrically conducting body. The first terminal to the first thermistor is physically affixed to and electrically connected to the first end of the thermally and electrically conducting body, and the first terminal of the second thermistor is physically affixed to and electrically connected to the second end of the thermally and electrically conducting body. One mechanism for comparing the relative electrical resistance of the two thermistors includes an electrical bridge network having an input port and an output port, mechanism for electrically connecting the first thermistor into the electrical bridge network and a mechanism for electrically connecting the second thermistor into the electrical bridge network. The electrical bridge network can be adjusted to have a predetermined voltage value obtained from the output when power is supplied to the input and fluid is flowing in the conduit across the second end of the thermally conducting body and a voltage measurably different from the predetermined voltage value obtained from the output when power is applied to the input and fluid is not flowing in the conduit across the second end of the thermally conducting body.

More specifically, the first insulation thermally insulates the thermally conductive body inside the closed ended stainless steel tube in the form of a cylinder of low thermal conductivity encircling the first two-thirds of the thermally conducting body and first heater, and a cylinder of second insulation which is of less low thermal conductivity (that is, it is more thermally conductive) encircles the remaining third of the thermally conducting body and the second heater. The closed-ended stainless steel tube extends into the conduit and the second end of the thermally conducting body with its more thermal conducting insulating material is exposed to the inside of the conduit.

BRIEF DESCRIPTION OF THE DRAWINGS

These and other objects, advantages and features of this invention will be apparent from the following description taken with reference to the accompanying drawings, wherein is shown some of the embodiments of the invention.

Figure 1:
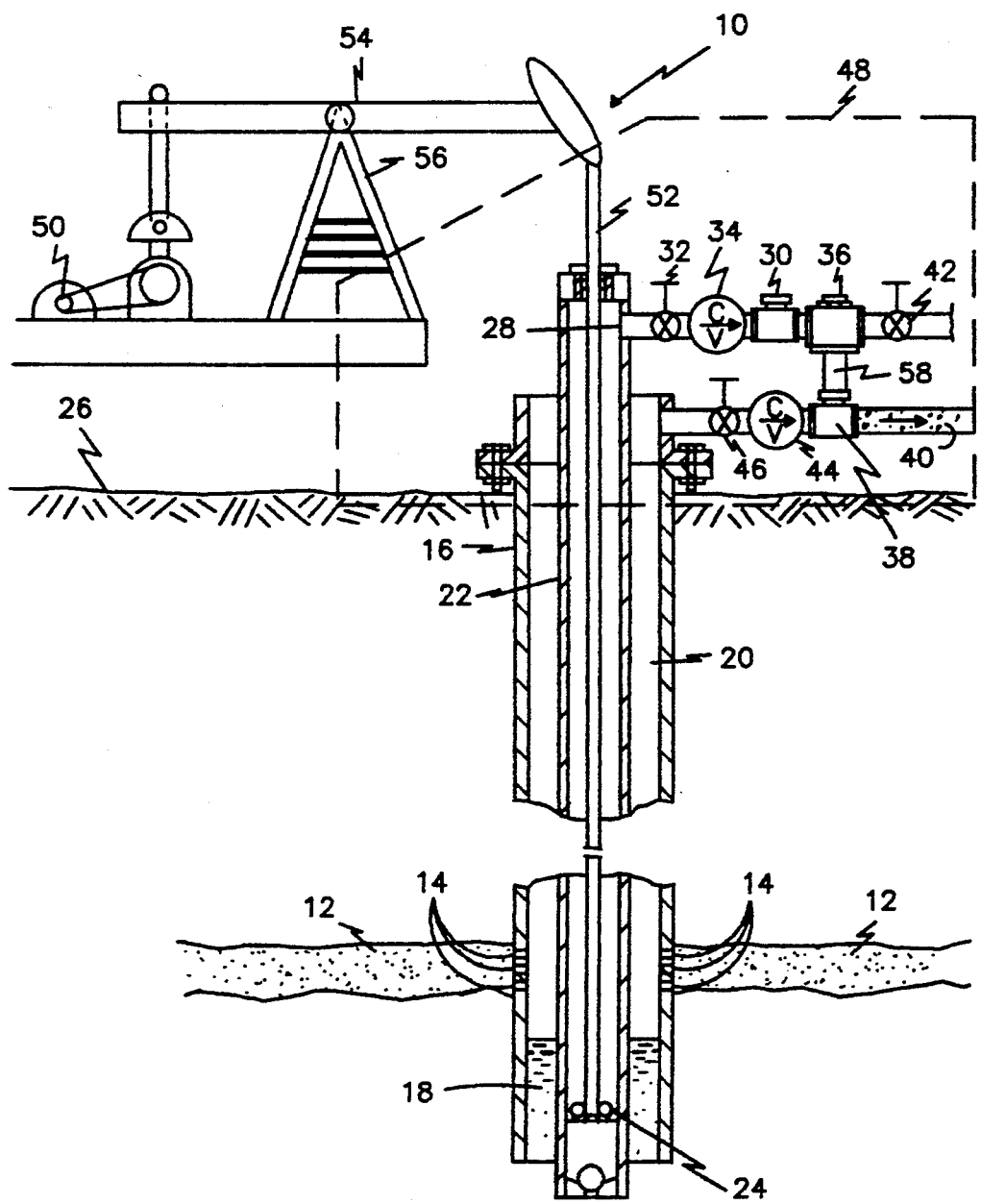
FIG. 1 is a pictorial representation of a pump produced oil well and a control apparatus according to the present invention.
Figure 2:
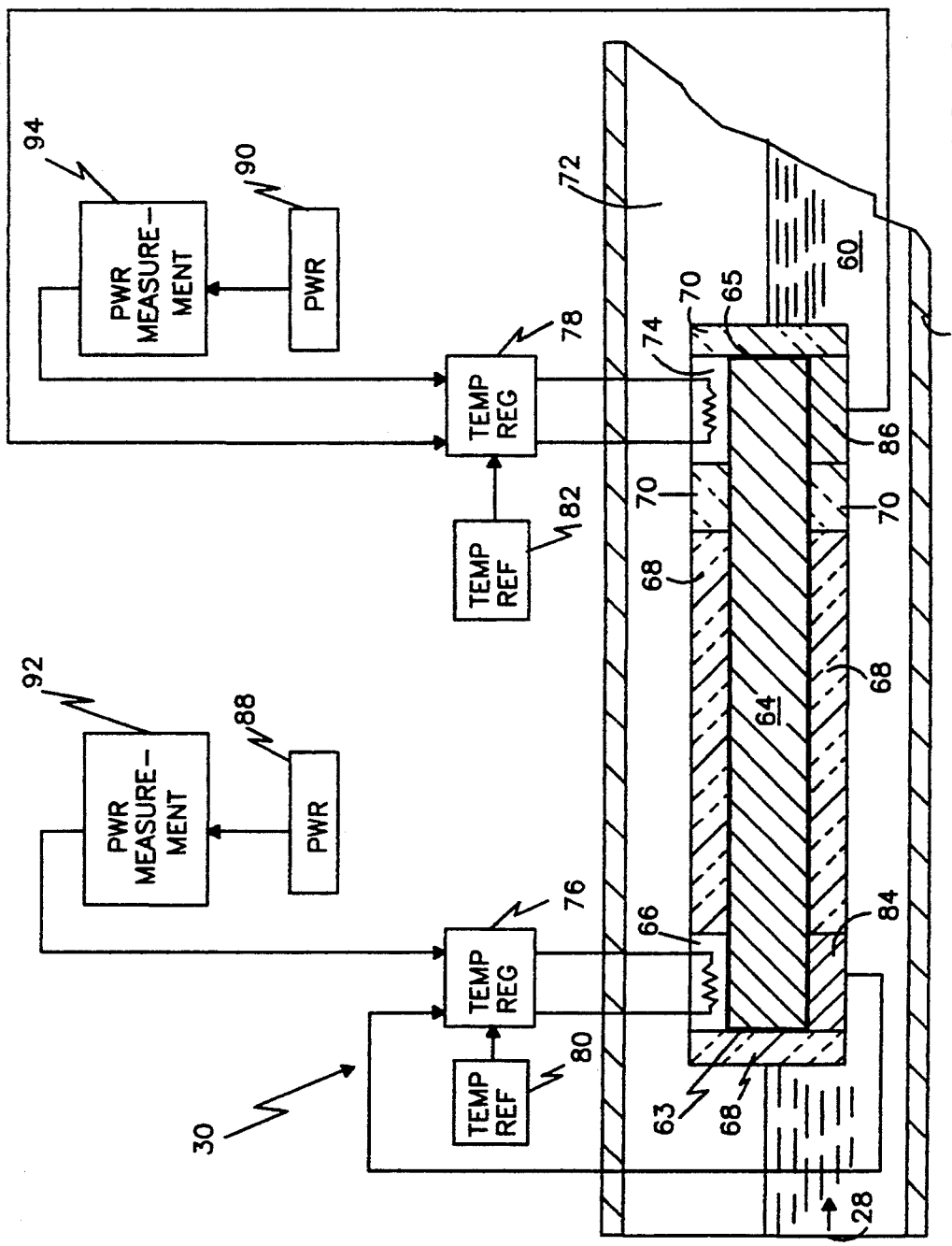
FIG. 2 is a schematic representation of one embodiment of an apparatus according to the present invention for detecting the presence of a fluid flowing in a conduit.
Figure 3:
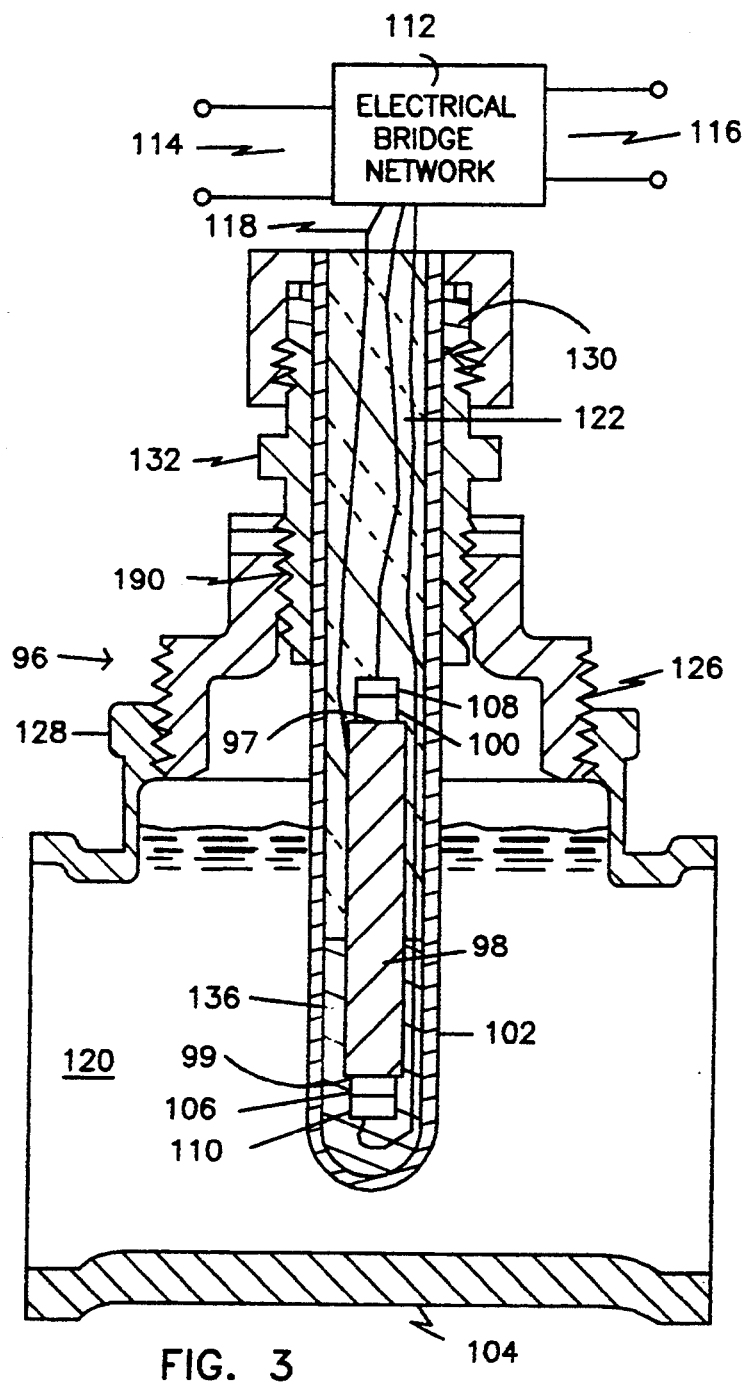
FIG. 3 is a cross-sectional view in elevation of another embodiment of an apparatus according to the present invention.

It will be appreciated that the representational views, such as FIGS. 1, 2 and 3 may not be to scale or proportion so as to clearly show all of the features of the present invention.

DETAILED DESCRIPTION OF THE INVENTION

The invention will now be described in more detail with reference to the various figures. In FIG. 1, a pump produced oil well is referred to generally by reference numeral 10. Oil bearing liquid from an underground formation 12 flows into a well bore through perforations 14 and a casing 16 and tubing string 22. A pump 24 lifts the liquid through tubing string 22 to a ground surface 26 where it is discharged from a wellhead 28 through a hand valve 32, a check valve 34, an apparatus 30 according to the present invention for detecting the presence of a fluid flow, a three-way coupling 36 and a lower three-way coupling 38 to flow output 40. The remaining output of three-way coupling 36 is normally blocked by a closed hand valve 42, and the remaining output of lower three-way coupling 38 is blocked by a checked valve 44. A hand valve 46 can also shut the remaining outlet from lower three-way coupling 38. The fluid path from the well head 28 to flow output 40 forms a production tree 48. Pump 24 is operated by pump power source 50 through polished rod 52 and beam 54 which is pivotally supported by sampson post 56. It will be noted that inventive apparatus 30 need not be positioned as shown in production tree 48 of FIG. 1. For example, there are any number of places in the production flow where the apparatus 30 may be situated, although it is preferred that apparatus 30 be on the tank side of these check valves as shown, which location is in a laminar flow regime.

When liquid column 18 is high enough to fully charge pump 24 for each pump stroke, then liquid is present in both apparatus 30 and in three-way coupling 36. In the event that the pumping rate exceeds the capacity of oil bearing formation 12 to supply the well bore with liquid, the height of the liquid column 18 will decrease with time. Eventually, pump 24 will no longer be immersed in liquid and the pumping rate will fall off, a condition known as "pumpoff". At this time, liquid flow ceases and gases present in the liquid and vented from the casing will collect in three-way coupling 36. The absence of fluid flow and the presence of gas in three-way coupling 36 and vertical member 58 connecting three-way coupling 36 with lower three-way coupling 38, is an early indication of pumpoff. If pump 24 continues to operate without a sufficient supply of liquid, a gas column will also develop in apparatus 30. If this occurs, polished rod 52 and its seals may begin to overheat and subsequently be damaged or destroyed. Once pumpoff occurs, the apparatus of the present invention causes pump 24 to stop in order to eliminate needless energy use and equipment wear. Pump 24 may be started again after sufficient time has passed to allow replenishment of liquid column 18 in well annulus 20.

Referring now to FIG. 2, one embodiment of an apparatus 30 according to the present invention for detecting the presence of a fluid flowing 60 in a conduit 62 includes a thermally conducting body 64 having a first end 63 and a second end 65 for placement inside 72 of conduit 62, a first heater 66 for heating the first end 63 of the thermally conducting body 64, first insulation 68 for thermally insulating the first two-thirds of the conducting body 64, second insulation 70 for thermally insulating the second end 615 and remaining one third of the thermally conducting body 64, a second heater 74 for heating the second end 615 of the conducting body 64. Apparatus 30 also includes temperature regulators 76 and 78 and temperature references 80 and 82 for comparing the relative rate of heat loss from the first end 63 of the thermally conducting body 64 and the second end 65 of the thermally conducting body 64. The temperature of the first and second ends 63 and 615 of the thermally conducting body 64 are measured by temperature measuring devices 84 and 86, respectively. The temperatures measured from temperature measuring devices 84 and 86 are compared to predetermined reference temperatures from temperature references 80 and 82, respectively, and since the referenced temperatures are predetermined, the temperature of the first and second ends 63, 65 of the thermally conducting body 64 are compared indirectly to each other so that the relative rates of heat loss from each end of the thermally conducting body are known. The process can be further monitored by measuring the total power input from power sources 88 and 90 by power measuring devices 92 and 94 respectively.

In one embodiment of the invention, thermally conducting body 64 is made of metal and/or preferably has a thermal conductivity (K) of at least 50 BTU/hr ft ° F., preferably about 56 BTU/hr ft ° F. It will be understood that the BTU component used herein are International BTUs or $BTU_{IT}$, not British BTUs. A preferred material of thermally conducting body 64 is selected from the group including, but not necessarily limited to, carbon steel, nickel, cupronickel 30%, aluminum bronze, red brass, zirconium alloy, titanium alloy, etc.

The first and second insulations 68 and 70 may be of any suitable low thermal conductivity material, including, but not necessarily limited to, silicon gel; synthetic polymers, e.g. polypropylene and other polyolefins, etc.; gypsum; cork; saw dust; ester oil; even air. Moldable materials are preferred for the insulation because they ease fabrication. Preferably, the insulations have a thermal conductivity at least below about 0.5 BTU/hr ft ° F., preferably below about 0.43 BTU/hr ft ° F. As noted, second insulation 70 must have less low thermal conductivity than first insulation 68, that is, it must be relatively more thermally conducting. This is to move the heat quantity in the direction of the second temperature measuring device 86. That is, second temperature measuring device 86 should lose heat at a greater rate than the first temperature measuring device 84. In one embodiment of the invention, the difference in thermal conductivity between first insulation 68 and second insulation 70 may range from about 0.067 BTU/hr ft ° F. for first insulation 68 to about 0.43 BTU/hr ft ° F. for second insulation 70.

In a certain embodiment of the invention, the thermally conducting body 64 has a thermal conductivity, K, of at least 50 BTU/hr ft ° F.; a nonlimiting example being regular steel at K=56 BTU/hr ft ° F. The first insulation 68 may have a K of at least 0.05 BTU/hr ft ° F.; a non-limiting example being K=0.067 BTU/hr ft ° F. for many polyolefins. Dead air at K=0.0148 BTU/hr ft ° F. would also be suitable. The second insulation 70 may have a K of at least 0.3 BTU/hr ft ° F.; for example only, K=0.43 BTU/hr ft ° F. for silicon gel, sawdust at K=0.41 BTU/hr ft ° F., cork at K=0.31 BTU/hr ft ° F., and even gypsum at K=0.52 BTU/hr ft ° F.

In one other embodiment of the invention, the thermal conductivity of the second insulation is at least about twice that of the first insulation 68; in another embodiment, second insulation 70 K is at least about 5 times greater than first insulation 68 K. Preferably, this difference is at least about 7 times greater. It will be appreciated that it is difficult to define this difference with precision, since it is dependent on the thermal conductivities of thermally conducting body 64, first insulation 68, second insulation 70 and tube 102 (see below).

It should also be appreciated that first and second insulations 68 and 70 need not exactly insulate a two-thirds and a one-third (2/3: 1/3) ratio, respectively of the length of thermally conducting body 64. By experimenting and testing, this ratio seems to work best and thus is preferred. However, ratios from ½: ½ to 9/10: 1/10 and beyond this range are anticipated to be useful. In one embodiment, first insulation 68 insulates a majority (defined as greater than 50%) of the length of thermally conducting body 64, while second insulation 70 covers the balance or a minority thereof (less than 50%). More preferably, the ratios of the body 64 covered range from about 7/12: 5/12 to about ¾: ¼ for the first and second insulations 68 and 70 respectively.

Referring now to FIG. 3, one of the preferred embodiments of the apparatus according to the present invention is referred to generally by reference number 96. Apparatus 96 includes a thermally conducting body 98 with first end 97 and second end 99, a first heater 100 for heating the first portion or end 97 of the thermally conducting body 98 and a second heater 106 for heating the second end 99 of the thermally conducting body 98. The mechanism for comparing the relative rates of heat loss from the first end 97 and second end 99 of the thermally conducting body 98 includes first temperature detector 108 and second temperature detector 110 thermally connected to the first heater 100 and the second heater 106, respectively, although the temperature detectors 108, 110 could be thermally connected directly to their respective thermally conducting ends 97, 99 in another arrangement. The comparing mechanism also includes an electrical bridge network 112 having an input port 114 and an output port 116, and mechanism 118 for electrically connecting the first temperature detector 108 and second temperature detector 110 into the electrical bridge network. Electrical bridge network 112 can be adjusted to have a predetermined value of voltage obtained from output port 116 when power is applied to input port 114 and fluid flowing 120 in conduit 104 across the second end or portion 99 of the thermally conducting body 98. A voltage measurably different from the predetermined voltage value is obtained from the output port 116 when power is supplied to the input port 114 and fluid 120 is not flowing in the conduit 104 across the second portion or end 99 of the thermally conducting body 98. Normally, the voltage at output port 116 of electrical bridge network 112 can be simply zeroed by an adjustment when liquid 120 is not flowing in conduit 104 so that any non-zero voltage at output 116 will indicate fluid 120 flowing in the conduit.

Apparatus 96 also includes a first insulation 122 for thermally insulating the thermally conducting body 98, which mechanism includes a cylinder of low thermal conductivity, such as a low thermal conductivity polymer encircling approximately the first two-thirds of the thermally conducting body 98 and extending down to the insulating material 136 which encircles or covers the remaining approximately one-third of the thermally conducting body 98 on the second end 99, thereof; all of this being enclosed in a close-ended stainless steel tube 102. Thermal conductivity, K, of the tube 102 should be at least about 10 BTU/hr ft ° F. For stainless steel, used in one embodiment herein, K=19 BTU/hr ft ° F. One range for K for tube 102 is from about 10 to about 20 BTU/hr ft ° F. Other suitable materials include, but are not limited to, Hastelloy C, Inconel X, Haynes Stellite alloy 25, Beryllium copper 25 or zirconium alloy. Regular steel at K=56 BTU/hr ft ° F.; brass at K=126 BTU/hr ft ° F. and copper at K=411 BTU/hr ft ° F. are all too thermally conductive. Nearly all plastics are unsuitable for tube 102 in crude oil pipeline applications because the crude oil contains natural gas which penetrates the plastic and thus serves as a source for corrosion. However, it is anticipated that such plastics may find use in detecting other fluid flows.

It should be noted that the tube 102 is seamlessly closed on its second or lower end unlike that seen in U.S. Pat. No. 4,311,047. The '047 device had a separate plug (second thermally conducting body) which was the site of corrosion and invasion of the apparatus after prolonged use.

Thermally insulating cylinders 122 and 136, all enclosed in the stainless steel closed ended tube 102 extends into conduit 104 so that the approximately bottom one-third of the stainless steel tube is exposed to the inside of conduit 104. It will be appreciated that the extent or depth of insertion of apparatus 96 into conduit 104 will vary from system to system and is not expected to absolutely be required to be one-third. In another embodiment, the closed end of tube 102 containing second end 99 is simply more deeply inserted into the fluid 120 than is the portion of tube containing first end 97. The stainless steel closed end tube 102 is exposed to the inside of conduit 104. As described, it will be appreciated that tube 102 need not be stainless steel as long as it is any impermeable material which does not corrode under conditions of expected use and is a moderate thermal conductor. The stainless steel closed ended tube 102 is supported by a cast iron pipe T 128 which forms the particular section of conduit 104. A brass ferrule 130 seals the connection between the stainless steel tube 102 and the brass tubing connection 132. The brass tubing connection 132 has sealing threads 190 which attach to the metal plug 126.

Figure 4:
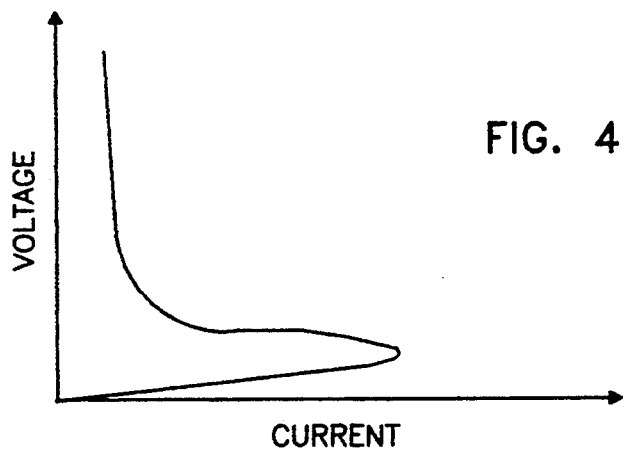
FIG. 4 is a graph representing voltage as a function of current for a positive temperature coefficient thermistor.
Figure 5:
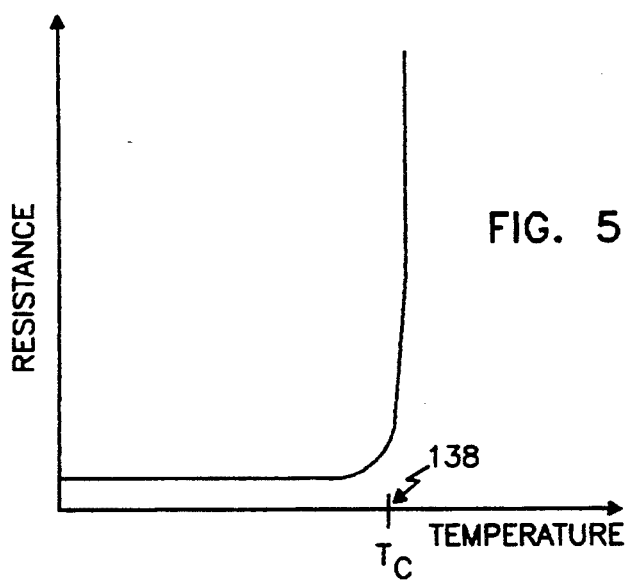
FIG. 5 is a graph representing resistance as a function of temperature for a positive temperature coefficient thermistor.

In a preferred embodiment, a first positive temperature coefficient thermistor comprises the first heater 100 and the first temperature detector 108, and a second positive temperature coefficient thermistor comprises the second or bottom heater 106 and second or bottom temperature detector 110. Referring also to FIGS. 4 and 5, the electrical characteristics of a positive temperature coefficient thermistor is such that if the thermistor is excited by a constant voltage source, joule heating will increase the temperature of the thermistor and therefore increase its resistance until the electrical power supplied to the thermistor and the rate of heat loss are in equilibrium. The equilibrium thermistor temperature is approximately the Curie temperature $T_c$ 138. The device temperature in this case is self-regulating provided that the heat loss is small enough that the available power input into the device is sufficient to maintain a temperature near $T_c$ 138.

In comparing the heat losses from a less insulated end 99 of a thermally conducting body 98 and an insulated end 97 maintained at a substantially constant temperature, the present invention determines whether heat is being lost to a gas, liquid or liquid flow. If the positive temperature coefficient thermistors are maintained at a constant voltage and conditions are such that a temperature near the Curie temperature is being held, it is sufficient to compare the currents through the positive temperature coefficient thermistors which heat the insulated and less insulated ends 97 and 99, respectively of the thermally conducting body 98.

Figure 6:
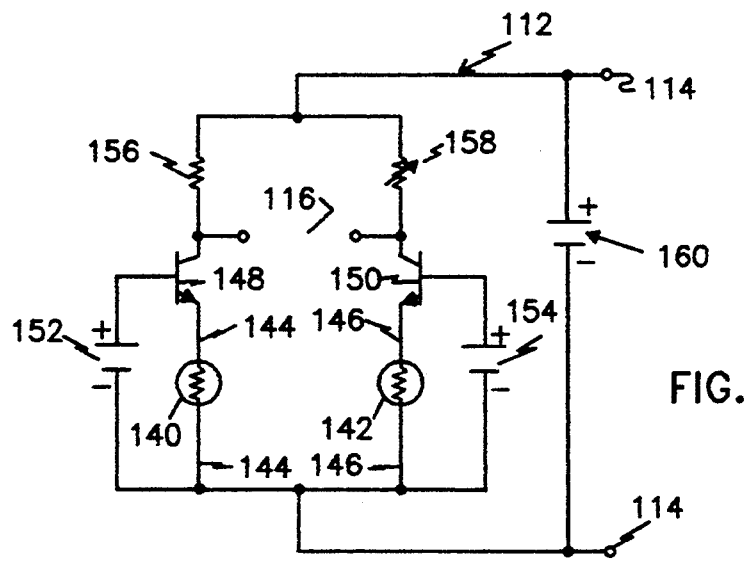
FIG. 6 is a schematic diagram of an electrical bridge for use in one embodiment of the present invention.

Referring now to FIG. 6, electrical bridge network 112 compares the relative electrical resistance of the first positive temperature coefficient thermistor 140 and the second positive temperature coefficient thermistor 142. The relative resistance of the two thermistors when fluid is flowing across the bottom one-third of the stainless steel closed ended tube 102 is measurably different from when fluid is not flowing across the bottom one-third of the stainless steel tube 102. Mechanism 118 (see FIG. 3) for electrically connecting the thermistors to electrical bridge network 112 comprise line 144 for electrically connecting the first thermistor 140 into electrical bridge network 112 and line 146 for electrically connecting the second thermistor 142 into electrical bridge network 112. Electrical bridge network 112 also includes first transistor 148 and second transistor 150 for driving first and second thermistors 140 and 142 respectively through their emitters. The base connections are to substantially equal voltage supplies 152 and 154, respectively. The collectors of the transistors are connected through resistor 156 and variable resistor 158, respectively, to power supply 160 connected at input 114. Electrical bridgework 112 can be adjusted by means of variable resistor 158 to have a predetermined value of voltage obtained from output port 116, preferably zero volts, when power is applied to input port 114 and fluid 120 is not flowing in conduit 104 across the bottom one-third or so of stainless steel tube 102. A voltage measurably different from the predetermined voltage value is obtained from output port 116 when power is applied to input port 114 and fluid is flowing in the conduit across the bottom one-third of the stainless steel tube 102.

Figure 7:
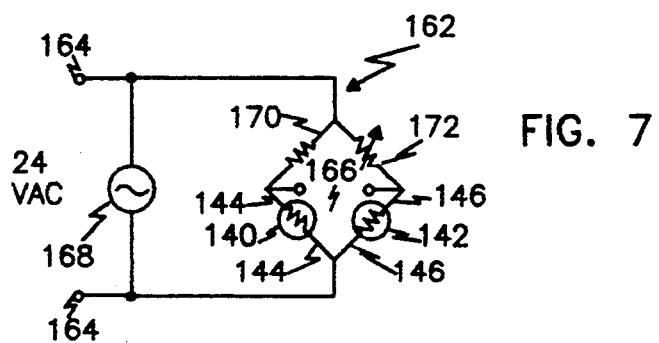
FIG. 7 is an alternative embodiment of an electrical bridge for use in the present invention.

With respect to FIG. 7, a simpler embodiment of the electrical bridge network is referred to generally by reference numeral 162, and it includes input port 164 and output port 166. Power supply 168 applies a 28 volt alternating current to input port 164 which is connected to a bridge made up of the first thermistor 140, second thermistor 142, resistor 170 and variable resistor 172. Again, the voltage at output port 166 can be zeroed by adjusting variable resistor 172 when fluid is known to be not flowing in conduit 104.

Figure 8:
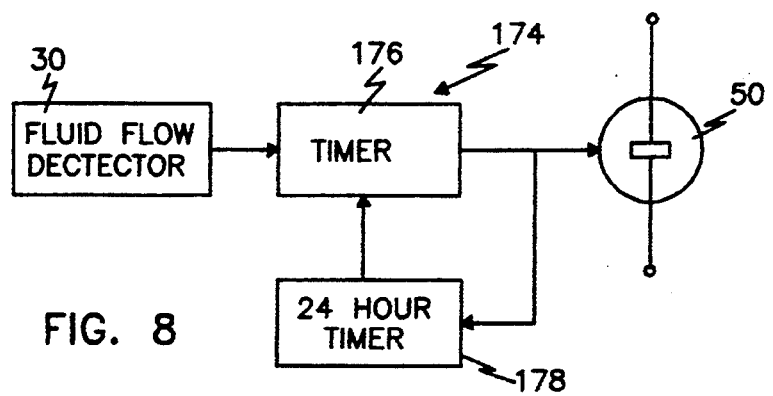
FIG. 8 is a control diagram showing the operation of a control unit according to the present invention.

Shown in FIG. 8 is a control system according to the present invention for a well pump that is referred to generally by reference numeral 174. Control system 174 includes apparatus 30 which is a fluid flow detector. Fluid flow detector 30 is located in the production tree 48 at a location where liquid flow is replaced by gas in the event of pumpoff. If liquid flow returns to the location during a predetermined time set by timer 176, then timer 176 is shut off so that pump power source 50 continues to operate pump 24. If, on the other hand, liquid flow does not return to the location of fluid flow detector 30 during the predetermined time, which would typically be in the order of ten to fifteen minutes, as a non-limiting example, then timer 176 stops the pump by turning off pump power source 50. Timer 176 also then starts a timer 178 for a longer period such as 24-hour timer 178. At the end of the predetermined time of the 24-hour timer 178, the 24-hour timer disables timer 176 by setting it back to zero, starting pump power source 50. In this way, if enough liquid has built up during the 24-hour period for pumping, then the pump can operate until pumpoff again occurs.

Because the presence or absence of liquid flow at a particular location is a gross condition which is easily detected, a control system according to the present invention may be implemented more reliably and less expensively than by other means.

An apparatus according to the present invention should have a long service life with little maintenance. It is simple and rugged, containing no moving parts, and is compatible with most corrosive substances containing sand, rocks, scale, paraffin and other debris. This apparatus is even simpler that that of U.S. Pat. No. 4,311,047 since there is only one thermally conducting body. Further, the present device is additionally improved over that of '047 since the end of the tube contacting the crude oil or other liquid is closed, sealed and seamless providing no possibility of corrosive attack or invasion to the interior structures. Installation is easier with the present device and no adjustment in the conduit is required. Temperature drift is greatly reduced with the new invention, and since the first and second thermistors are thermally coupled, the power consumed in the top and bottom (when the device is vertically oriented) give a better representation of fluid flow than the device of U.S. Pat. No. 4,311,047. In addition, the apparatus is relatively insensitive to large variations in ambient temperatures.

From the foregoing it will be seen that this invention is one well adapted to obtain all of the ends and objects herein above set forth, together with other advantages which are obvious and which are inherent in the apparatus. It will be understood that certain features and subcombinations are of utility and may be employed without reference to other features and subcombinations. This is contemplated by and within the scope of the claims. As many possible embodiments may be made of the invention without departing from the scope thereof, it is to be understood that all matter herein set forth or shown in the accompanying drawings is to be interpreted as illustrative and not in a limiting sense. For example, while the invention has been discussed in the context of a control system to avoid a prolonged pumpoff situation during the production of crude oil, it will be appreciated that the invention will find other uses in detecting the presence or absence of a fluid or fluid flow.

What is claimed is:

1. An apparatus for detecting the presence of a fluid flowing in a conduit, comprising:
   one thermally conducting body having a first end and a second end, at least the second end being placed inside the conduit;
   a first heater for heating the first end of the thermally conducting body;
   a second heater for heating the second end of the thermally conducting body;
   first insulation of a first low thermal conductivity surrounding the first end of the thermally conducting body and the first heater;
   second insulation of a second low thermal conductivity surrounding the second end of the thermally conducting body and the second heater, where the second low thermal conductivity has higher thermal conductivity than the first low thermal conductivity; and
   means for comparing the relative rates of heat loss from the first end of the thermally conducting body and the second end of the thermally conducting body,
   where temperature drift is improved, fluid flow is better represented and sensitivity to large variations in temperature is reduced as compared with an apparatus having more than one thermally conducting body.

2. The apparatus of claim 1 where the thermally conducting body, the first heater, the second heater, the first insulation and the second insulation are contained in a tube with a seamlessly closed end, where the second end of the thermally conducting body is closer to the closed end than the first end of the thermally conducting body.

3. The apparatus of claim 2 where the tube has a thermal conductivity of at least 10 BTU/hr ft ° F.

4. The apparatus of claim 3 wherein the tube is stainless steel.

5. The apparatus of claim 1 where the thermally conducting body has a thermal conductivity of at least 50 BTU/hr ft ° F.

6. The apparatus of claim 1 where the first insulation has a first low thermal conductivity of at least 0.05 BTU/hr ft ° F., second insulation has a second low thermal conductivity of at least 0.5 BTU/hr ft ° F. and the second low thermal conductivity is at least twice the first low conductivity.

7. The apparatus of claim 6 where the first insulation is selected from the group consisting of a polyolefin and air, and the second insulation is selected from the group consisting of silicon gel, sawdust, ester oil, cork and gypsum.

8. The apparatus of claim 1 where the thermally conducting body has a length separating the first and second ends thereof, and where the first insulation extends a majority of the length of the thermally conducting body from the first end thereof.

9. The apparatus of claim 1 where the thermally conducting body has a length separating the first and second ends thereof, and where the first insulation extends at least two-thirds the length of the thermally conducting body from the first end thereof.

10. The apparatus of claim 1 where
    the first heater is a first positive temperature coefficient thermistor thermally coupled to the first end of the thermally conducting body, and
    the second heater is a second positive temperature coefficient thermistor thermally coupled to the second end of the thermally conducting body.

11. The apparatus of claim 10 where the means for comparing the relative rates of heat loss is a means for comparing the relative electrical resistance of the first thermistor and the second thermistor where the relative resistance of the two thermistors when fluid is flowing in the conduit is measurably different from the relative resistance when fluid is not flowing in the conduit.

12. An apparatus for detecting the presence of a fluid flowing in a conduit, comprising:
    a thermally conducting body having a first end and a second end, at least the second end being placed inside the conduit, where the thermally conducting body is also electrically conducting;
    a first positive temperature coefficient thermistor electrically and thermally connected to the first end of the thermally conducting body, for heating the first end of the thermally conducting body;
    a second positive temperature coefficient thermistor electrically and thermally connected to the second end of the thermally conducting body, for heating the second end of the thermally conducting body;
    first insulation of a first low thermal conductivity surrounding the first end of the thermally conducting body and the first heater;
    second insulation of a second low thermal conductivity surrounding the second end of the thermally conducting body and the second heater, where the second low thermal conductivity has higher thermal conductivity than the first low thermal conductivity; and
    a means for comparing the relative electrical resistance of the first thermistor and the second thermistor where the relative resistance of the two thermistors when fluid is flowing in the conduit is measurably different from the relative resistance when fluid is not flowing in the conduit.

13. The apparatus of claim 12 where the means for comparing the relative electrical resistance of the first thermistor and the second thermistor further comprises:
    an electrical bridge network having an input port and an output port, where the electrical bridge network can be adjusted to have a predetermined value of voltage obtained from the output port when power is applied to the input port and fluid is flowing in the conduit and a voltage measurably different from the predetermined voltage value obtained from the output port when power is applied to the input port and fluid is not flowing in the conduit;
    means for electrically connecting the first thermistor into the electrical bridge network; and
    means for electrically connecting the second thermistor into the electrical bridge network.

14. An apparatus for detecting the presence of a fluid flowing in a conduit, comprising:
    a thermally conducting body having a first end, a second end and a length, at least the second end being placed inside the conduit;
    a first heater for heating the first end of the thermally conducting body;
    a second heater for heating the second end of the thermally conducting body;
    first insulation of a first low thermal conductivity surrounding the first end of the thermally conducting body and the first heater;
    second insulation of a second low thermal conductivity surrounding the second end of the thermally conducting body and the second heater, where the second low thermal conductivity has higher thermal conductivity than the first low thermal conductivity, and where the ratio of the length of the thermally conducting body surrounded by the first insulation to the length covered by the second insulation ranges from about ½: ½ to about 9/10: 1/10;
    a tube having a closed end and an interior, the tube containing the thermally conducting body, the first heater, the second heater, the first insulation and the second insulation, where the second end of the thermally conducting body is closer to the closed end than the first end of the thermally conducting body is to the closed end,
    and where the second insulation extends from the second end of the thermally conducting body and the second heater to the interior of the closed end of the tube, and
    means for comparing the relative rates of heat loss from the first end of the thermally conducting body and the second end of the thermally conducting body.

15. The apparatus of claim 14 where the first insulation extends at least two-thirds the length of the thermally conducting body from the first end thereof.

16. The apparatus of claim 14 where
    the first heater is a first positive temperature coefficient thermistor thermally coupled to the first end of the thermally conducting body, and
    the second heater is a second positive temperature coefficient thermistor thermally coupled to the second end of the thermally conducting body.

17. The apparatus of claim 16 where the means for comparing the relative rates of heat loss is a means for comparing the relative electrical resistance of the first thermistor and the second thermistor where the relative resistance of the two thermistors when fluid is flowing in the conduit is measurably different from the relative resistance when fluid is not flowing in the conduit.

18. The apparatus of claim 17 where
the thermally conducting body is also electrically conducting;
the first positive temperature coefficient thermistor is electrically connected to the first end of the thermally conducting body; and
the second positive temperature coefficient thermistor is electrically connected to the second end of the thermally conducting body.

19. The apparatus of claim 17 where the means for comparing the relative electrical resistance of the first thermistor and the second thermistor further comprises:
an electrical bridge network having an input port and an output port, where the electrical bridge network can be adjusted to have a predetermined value of voltage obtained from the output port when power is applied to the input port and fluid is flowing in the conduit and
a voltage measurably different from the predetermined voltage value obtained from the output port when power is applied to the input port and fluid is not flowing in the conduit;
means for electrically connecting the first thermistor into the electrical bridge network; and
means for electrically connecting the second thermistor into the electrical bridge network.

20. An apparatus for detecting the presence of a fluid flowing in a conduit, comprising:
a thermally conducting body having a first end, a second end and a length, at least the second end being placed inside the conduit;
a first positive temperature coefficient thermistor thermally coupled to the first end of the thermally conducting body;
a second positive temperature coefficient thermistor thermally coupled to the second end of the thermally conducting body;
first insulation of a first low thermal conductivity surrounding the first end of the thermally conducting body and the first heater;
second insulation of a second low thermal conductivity surrounding the second end of the thermally conducting body and the second heater, where the second low thermal conductivity has higher thermal conductivity than the first low thermal conductivity, and where the first insulation surrounds at least two-thirds the length of the thermally insulating body;
a tube having a closed end and an interior, the tube containing the thermally conducting body, the first heater, the second heater, the first insulation and the second insulation, where the second end of the thermally conducting body is closer to the closed end than the first end of the thermally conducting body is to the closed end, and where the second insulation extends from the second end of the thermally conducting body and the second heater to the interior of the closed end of the tube, and
means for comparing the relative electrical resistance of the first thermistor and the second thermistor where the relative resistance of the two thermistors when fluid is flowing in the conduit is measurably different from the relative resistance when fluid is not flowing in the conduit.

21. The apparatus of claim 20 where
the thermally conducting body is also electrically conducting;
the first positive temperature coefficient thermistor is electrically connected to the first end of the thermally conducting body; and
the second positive temperature coefficient thermistor is electrically connected to the second end of the thermally conducting body.

22. The apparatus of claim 21 where the means for comparing the relative electrical resistance of the first thermistor and the second thermistor further comprises:
an electrical bridge network having an input port and an output port, where the electrical bridge network can be adjusted to have a predetermined value of voltage obtained from the output port when power is applied to the input port and fluid is flowing in the conduit and
a voltage measurably different from the predetermined voltage value obtained from the output port when power is applied to the input port and fluid is not flowing in the conduit;
means for electrically connecting the first thermistor into the electrical bridge network; and
means for electrically connecting the second thermistor into the electrical bridge network.

23. An apparatus for detecting the presence of a fluid flowing in a conduit, comprising:
a thermally conducting and electrically conducting body having a first end and a second end, at least the second end being placed inside the conduit;
a first positive temperature coefficient thermistor thermally coupled to and electrically connected to the first end of the thermally conducting body, for heating the first end of the thermally conducting body;
a second positive temperature coefficient thermistor thermally coupled to and electrically connected to the second end of the thermally conducting body, for heating the second end of the thermally conducting body;
first insulation of a first low thermal conductivity surrounding the first end of the thermally conducting body and the first heater;
second insulation of a second low thermal conductivity surrounding the second end of the thermally conducting body and the second heater, where the second low thermal conductivity has higher thermal conductivity than the first low thermal conductivity; and
means for comparing the relative rates of heat loss from the first end of the thermally conducting body and the second end of the thermally conducting body.

* * * * *